United States Patent [19]

Maligne et al.

[11] Patent Number: 5,012,903
[45] Date of Patent: May 7, 1991

[54] AUTOMATICALLY ADJUSTABLE SPACER FOR A DRUM BRAKE

[75] Inventors: Jean-Charles Maligne, Aubervilliers; Jean-Louis Magnaval, Neuilly-Plaisance, both of France

[73] Assignee: Bendix France, Drancy, France

[21] Appl. No.: 422,202

[22] Filed: Oct. 16, 1989

[30] Foreign Application Priority Data

Oct. 25, 1988 [FR] France ................. 88 13905

[51] Int. Cl.$^5$ .............................................. F16D 65/58
[52] U.S. Cl. ............................ 188/79.54; 188/196 B; 188/196 V; 192/111 A
[58] Field of Search ............... 188/79.54, 79.52, 79.63, 188/79.64, 196 V, 196 B; 192/111 A

[56] References Cited

FOREIGN PATENT DOCUMENTS

| | | |
|---|---|---|
| 2530930 | 1/1977 | Fed. Rep. of Germany . |
| 3702791 | 8/1977 | Fed. Rep. of Germany . |
| 2932340 | 3/1981 | Fed. Rep. of Germany ... 188/79.64 |
| 2511457 | 2/1983 | France . |
| 2537230 | 6/1984 | France . |
| 149628 | 7/1986 | Japan ................. 188/79.63 |
| 2103738 | 2/1983 | United Kingdom ............. 188/79.64 |

*Primary Examiner*—George A. Halvosa
*Attorney, Agent, or Firm*—Larry J. Palguta; Ken C. Decker

[57] ABSTRACT

The invention relates to an automatically adjustable spacer for a drum brake, comprising essentially a first part (10) bearing at one of its ends on a first shoe (3), a second part (16) bearing at the opposite end on the second shoe (2), the first and second parts (10, 16) being mounted slidably longitudinally relative to one another, a locking element (30), at least part of the periphery of which has a toothing, mounted movably on one of the first and second parts and capable of meshing with a corresponding toothing (28) provided opposite it on part of the periphery of the other of the first and second parts, so as to define a device for the automatic extension of the spacer as a function of the wear of the friction elements. The locking element (30) which is mounted movably in terms of rotation about a pin (32) and pin being mounted movably in terms of longitudinal translational motion in a slot provided in the part (10), is in form of a toothed cam the rotational movement of which results in an increase of the distance between the pin (32) and the meshing zone of the toothings, and a spring imparts a rotational movement to the locking element as soon as the toothing no longer mesh with one another.

2 Claims, 1 Drawing Sheet

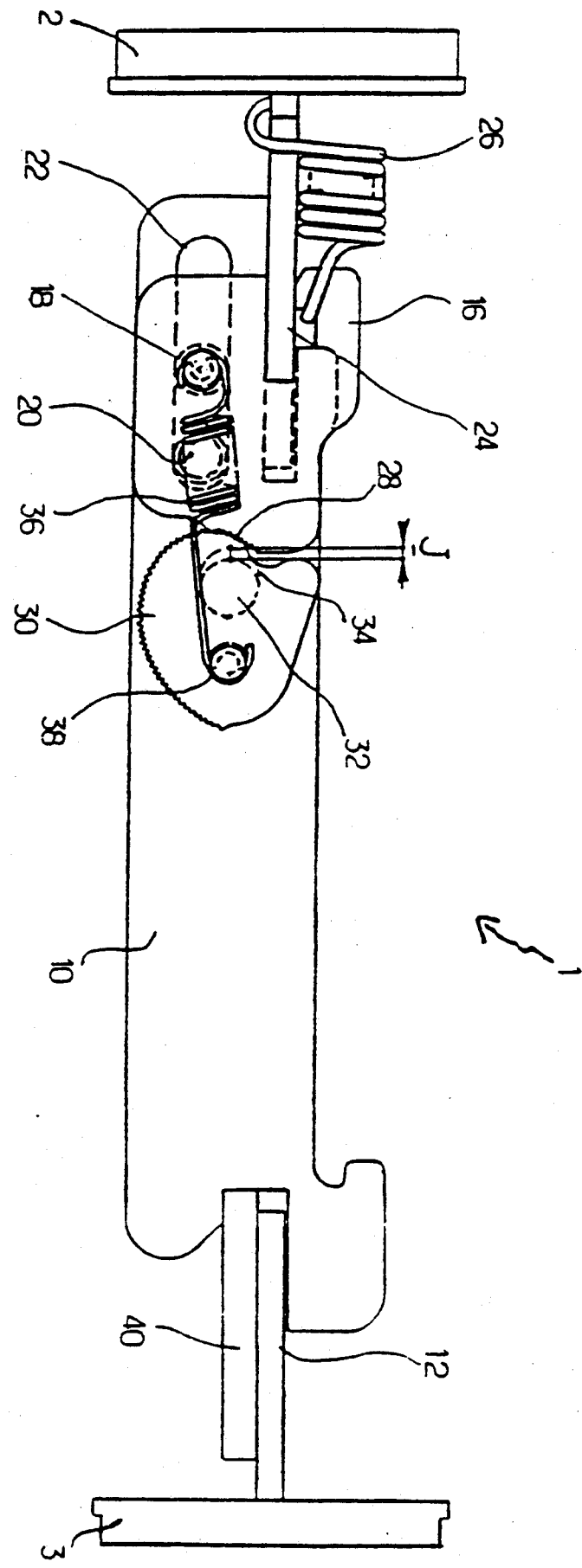

AUTOMATICALLY ADJUSTABLE SPACER FOR A DRUM BRAKE

BACKGROUND OF THE INVENTION

The present invention relates to drum brakes for motor vehicles and more particularly to an automatically adjustable spacer for such a brake.

There are various known systems making it possible for the distance between the ends, moved by means of the brake motor, of two shoes fitted with friction elements of a drum brake to be lengthened automatically as a function of the wear of these.

U.S. Pat. No. 4,217,973 describes, for example, a system with a spacer of fixed length and with a lever articulated on one of the shoes. Such a system, although functioning perfectly well, has a disadvantage as regards the maintenance of the brake; in fact, the articulated lever has to be changed at the same time as the corresponding shoe in the event that the latter undergoes wear.

U.S. Pat. No. 4,503,949 describes a system with a spacer of variable length, possessing a screw/nut assembly controlled by a pawl exerting stress on a toothing. Such a system likewise functions perfectly well, but has the disadvantage of being costly.

The document GB-1,405,094 also describes a system with a spacer of variable length, but having an angle lever which is moved angularly and one of the arms of which interacts with a toothed element of another part of the spacer. Such a system has the serious disadvantage of considerable bulk because of the presence of this angle lever.

It is known that motor vehicle manufacturers would like to use drum brakes with a reliable but inexpensive automatic adjustment which does not occupy a large amount of space, so that the speed sensor required for the functioning of the wheel antilock devices can be arranged in the brake.

SUMMARY OF THE INVENTION

According to the invention, this object is achieved by means of a linear system of automatic adjustment.

The invention therefore relates to an automatically adjustable spacer for a drum brake, intended to be mounted in the vicinity of a clamping means arranged between the movable ends of two shoes fitted with friction elements. This spacer comprises essentially a first part bearing at one of its ends on a first shoe, a second part bearing at the opposite end on the second shoe, the first and second parts being mounted slidably longitudinally relative to one another, a locking element, at least part of the periphery of which has a toothing, mounted movably on one of the first and second parts and capable of meshing with a corresponding toothing provided opposite it on part of the periphery of the other of the first and second parts, and a draw spring fastened to one of said first and second parts and to the locking element so as to define a device for the automatic lengthening of the distance between the opposite ends of the first and second parts bearing respectively on one of the shoes, as a function of the wear of the friction elements.

Such an adjustable spacer is disclosed in GB-A-2,103,738. However, the design of this spacer is such that it requires the use of resilient tongs to move the locking element, said tongs being a very fragile member with regard to a drum brake.

According to the invention, the locking element which is mounted movably in terms of rotation about a pin and this pin being mounted movably in terms of longitudinal translational motion in a slot provided in said one part, is in form of a toothed cam the rotational movement of which results in an increase of the distance between the pin and the meshing zone of the toothings, the spring imparting a rotational movement to the locking element as soon as said toothings no longer mesh with one another.

Preferably, the length of the toothing provided on one of the first and second parts is substantially equal to the length of the meshing zone of the toothings when the spacer is completely extended, while a toothing is provided over substantially half the periphery of the locking element.

The invention also relates to an automatically adjustable drum brake comprising two shoes fitted with friction elements capable of being stressed in frictional engagement against a rotating drum by a clamping means arranged between two first ends of the shoes, and having a spacer of the above-described type located in the vicinity of the clamping means.

BRIEF DESCRIPTION OF THE DRAWING

The invention will now be described by way of example with reference to the accompanying drawing in which:

the single figure shows a diagrammatic view of a spacer according to the present invention.

DETAILED DESCRIPTION OF THE INVENTION

Referring now to this single figure, the spacer 1 defines a variable length between two brake shoes 2, 3 as a function of the wear of the friction elements with which they are fitted. This spacer 1 comprises a first part 10 bearing on the shoe 3, for example by means of the handbrake lever 40 or the web 12 of the shoe. This part 10 is therefore governed in terms of translational motion by the shoe 3, for example by means of a spring (not shown).

The spacer 1 also comprises a second part 16 which bears on the other shoe 2 by means of the web 24 of the latter. It is therefore governed in terms of translational motion by the shoe 2, for example by means of the spring 26.

The first and second parts 10, 16 are mounted slidably relative to one another in terms of translational motion. For this purpose, an oblong slot 22 is made in the first part 10, while the second part 16 carries two aligned pins 18 and 20 sliding in this slot 22, so as to define an element for guiding the two parts relative to one another.

The second part 16 of the spacer carries a toothed quadrant 28 on its periphery opposite the other shoe 3.

A locking element 30 in the form of a toothed cam is mounted movably in terms of rotation about its pin 3 which itself can move in terms of longitudinal translational motion in an oblong slot 34 made for this purpose in the first part 10 of the spacer 1. The difference between the length of this slot 34 and the diameter of the pin 32 defines what a person skilled in the art calls the "functional play" J.

A draw spring 36 is fastened on the one hand, for example, to the second part 16 of the spacer 1 by means of the pin 18 and on the other hand to the toothed cam 30 at a point 38 distant from the pivot pin 32 of the toothed cam, so as to maintain the meshing of the toothings of the toothed cam and of the second part 16 of the spacer and to impart a rotational movement to this toothed cam 30 as soon as these toothings no longer mesh with one another.

A person skilled in the art will see that the distance between the pivot pin 32 of the toothed cam and the toothed periphery of the latter increases progressively from left to right in the Figure, and that the effect of the above-mentioned rotational movement is to increase the distance between this pivot pin 32 and the meshing zone of the two toothings.

During braking, the clamping means, not shown in the figure, shifts apart the two shoes 2, 3 fitted with frictional elements towards a drum (not shown). The two parts 10, 16 of the spacer, since they are respectively governed in terms of translational motion by the shoes 3 and 2, move apart together with the shoes, the pins 18 and 20 sliding in the oblong slot 22 and maintaining the alignment of the assembly as a whole. In the first place, under the action of the spring 36 the pivot pin 32 of the toothed cam 30 moves in terms of translational motion over the distance J and comes up against the opposite part of the oblong slot 34, thus cancelling the functional play J which makes it possible for the length of the spacer not to be increased as long as the additional spacing of the shoes during braking does not exceed this distance J. Thus, if this distance is not exceeded and the brake is released, the system returns to the rest position shown and the spacer has not been extended.

On the contrary, if this distance J is exceeded, the toothing of the toothed quadrant 28 of the second part 16 of the spacer 1 comes out of meshing with that of the toothed cam 30 which, under the action of the spring 36, starts to rotate about its pin 32 until these toothings mesh with one another again. When the brake is released, the functional play J will still exist, but the distance between the meshing zone of the toothings and the pin pivot 32 of the toothed cam will have increased by an amount corresponding to the additional spacing of the shoes during braking, less the length of the functional play J.

A person skilled in the art will see that, because of the respective radii of curvature of the toothings, the meshing zone of the toothings is always located at the same place on the toothed quadrant 28 of the periphery of the second part 16 of the spacer, whatever the angular position of the toothed cam 30, and that therefore the length of the toothed quadrant 28 provided on the second part 16 of the spacer 1 corresponds substantially to the length of the meshing zone of the toothings when the spacer is completely extended, thus making it possible to minimize the bulk of the system as a whole. Consequently, a corresponding toothing is provided over approximately half the periphery of the toothed cam 30.

Finally, by a careful choice of the fastening point 38 of the draw spring 36 on the toothed cam 30, the rotational movement imparted to the latter by the spring 36 can be cancelled when the spacer 1 is completely extended.

Although only one embodiment of the invention has been described and illustrated, it is clear that a person skilled in the art can make many changes or modifications to it, without departing from the scope of the invention as claimed. For example, the oblong slot 22 can be made in either one of the first and second parts 10, 16, the pins 18 and 20 being provided in the other part; the assembly consisting of the oblong slot 22 and of the pins 18, 20 can be replaced by any other means of linear guidance; the end of the spring 36 not fastened to the toothed cam 30 can be fastened at another point of the system, provided that the spring tends to maintain the meshing of the toothings and impart a suitable rotational movement to the toothed cam 30 when the toothings come out of meshing, in order to mesh them with one another again; the first and second parts 10, 16 of the spacer 1 can be fastened to the corresponding shoes by any means other than a spring.

What we claim is:

1. An automatically adjustable spacer for a drum brake, intended to be mounted in the vicinity of clamping means arranged between movable ends of first and second shoes fitted with friction elements, said spacer comprising essentially:

a first part bearing at one end on the first shoe, and a second part bearing at an opposite end on the second shoe, said first and second parts being mounted slidably longitudinally relative to one another and said shoes, a locking element, substantially half of a periphery of which has a toothing, mounted movably on said first part and meshing only with a corresponding toothed quadrant provided oppositely on part of a curved periphery of said second part, said locking element being mounted movably in terms of rotation about a pin integral with said locking element, said pin being mounted movably in terms of longitudinal translational motion in a slot provided in said first part, and being in the form of a toothed cam a rotational movement of which results in an increase of a distance between said pin and a meshing zone between said toothing at the periphery of said locking element and said toothed quadrant at the curved periphery of said second part, and a draw spring fastened to said second part and to said locking element, said spring imparting a rotational movement to said locking element as soon as said toothing and said toothed quadrant no longer mesh with one another, the length of said toothed quadrant provided on said second part being substantially equal to the length of said meshing zone when said spacer is completely extended.

2. The spacer according to claim 1, wherein the spacer is part of an automatically adjustable drum brake, the shoes fitted with the friction elements which are capable of frictional engagement with a rotating drum by means of the clamping means arranged between the movable ends of said shoes.

* * * * *